3,484,549
TELEVISION-ASSISTED AIRCRAFT LANDING
AND MONITORING SYSTEM
Colin J. Ricketts, 1006 Polaris Drive, Point Mugu, Calif.
93041; Andrew J. Bodnar, U.S.S. Tripoli, LPH 10,
FPO, New York, N.Y. 09501; Frederick T. Braithwaite, 2055 Eucalyptus, San Carlos, Calif. 94070;
Seward R. Johnson, 7996 El Capitan Drive, La Mesa,
Calif. 92041; and Ernest E. Wheeler, 5938 Eton
Court, San Diego, Calif. 92122
Continuation-in-part of application Ser. No. 604,485,
Dec. 23, 1966. This application Feb. 2, 1968, Ser.
No. 702,604
Int. Cl. H04n 7/00, 3/00
U.S. Cl. 178—6                       6 Claims

ABSTRACT OF THE DISCLOSURE

A system for assisting the pilot of an aircraft to land on an area of restricted size, such as the flight deck of a carrier. An image of the approaching aircraft is picked up by a television camera located along the center line of the landing strip, and this image is transmitted back so as to appear on a monitor in the aircraft cockpit. By so guiding the aircraft that the image reproduced on this monitor is brought to a position in the center of the screen and maintained in this position, the pilot can follow the proper approach path to a perfect landing. Also disclosed is apparatus for making a pictorial record of the entire landing operation, which record (together with superimposed data representing then-existing weather conditions) can subsequently be played back for pilot evaluation and training purposes, as well as to determine the cause of any accident which may occur.

---

The invention described herein may be manufactured and used by or for the Government of the United States of America for governmental purposes without the payment of any royalties thereon or therefor.

CROSS-REFERENCE TO RELATED APPLICATION

The present application is a continuation-in-part of application Ser. No. 604,485 filed Dec. 23, 1966 and entitled "Aircraft Monitoring and Pilot Training System" and now abandoned.

BACKGROUND OF THE INVENTION

The present invention relates to a system which employs television techniques to assist the pilot of an aircraft in making a landing on an area of restricted size, such as the flight deck of a carrier. In addition, the invention embraces the development of a pictorial image of each landing (or take-off) operation, and employing such data for subsequent evaluation and analysis either by the pilot of the aircraft involved or both others concerned with some aspect of his performance.

The landing of a modern high-speed jet aircraft on the flight deck of a carrier is a feat requiring considerable skill and experience on the part of the pilot. Even though resiliently-supported arresting cables are provided which normally intercept and rapidly decelerate an aircraft following touchdown, it is nevertheless extremely important that the entire landing operation proceed according to a prescribed pattern, as otherwise damage to the aircraft and/or injury to the pilot is likely to occur. The pilot is customarily aided in carrying out the landing operation by the presence of an individual designated as the Landing Signal Officer (LSO) whose duties are to convey information to the pilot of an approaching aircraft with respect to the latter's position. During landing operations, this individual is stationed to one side of the runway, and formerly signaled the pilot visually by means of paddles held in each hand. However, the extremely high landing speeds of jet aircraft materially reduced the available time during which signals could be given, so that the pilot of the aircraft had to react immediately in order to complete the necessary positional corrections before the aircraft reached the landing surface. Only by acquiring experience over extended periods of time could a pilot become proficient along these lines, and during his training period he occasionally failed to perform each aspect of the landing operation in an ideal manner.

It is consequently highly desirable that some system be available that will provide an accurate record of the pilot's landings, and furthermore that such record be in a form capable of being played back or reconstituted at a later time in order that the pilot may observe his own landing and recognize those features thereof which require correction. In other words, the pilot, by means of such a system, will be in a position to evaluate his own performance. In addition, he may receive constructive comments from others on steps which might be taken to bring about an improvement in one or more phases thereof. At the same time, a system of this nature possesses the further advantage of providing a permanent record of any accident which may occur during or following the landing, so that the cause of such accident may be more readily determined. Still further, by developing a pictorial representation of an approaching aircraft, the Landing Signal Officer may be provided with data which is usually far superior to that obtainable with the naked eye, especially under adverse environmental conditions when visibility is limited. As a still further advantage, pertinent data as to wind direction, wind speed, aircraft velocity, etc. may be recorded along with the pictorial representation of the aircraft, so that all of the factors involved in a landing operation may be integrated into a single "unit" of information capable of being retained indefinitely or for as long a time as it may be required.

To enable the aircraft pilot to fly a perfect approach to the landing area, he must be continuously provided with accurate information as to his position with respect to the touch-down point. This is especially true when the runway is wholly or partially obscured by poor weather conditions, or when the pilot is unable to see clearly the Landing Signal Officer. The present invention contemplates the development of an image of the approaching aircraft by a television camera mounted on the center line of the landing strip at the optimum touch-down point. This image is televised back to the aircraft and presented to the pilot on a monitor located in the cockpit. An off-center position of this image on the monitor screen indicates a deviation from the proper approach path to a perfect landing, and emphasizes the necessity for corrective measures. By thus enabling the pilot to manually control the landing operation, he is given a psychological advantage as compared to any completely automatic or "hands-off" system now available.

In accordance with a further feature of the present invention, a closed circuit television system is provided which employs a plurality of television cameras stationed at strategic points in the region of an aircraft landing area of limited size, such as the mentioned carrier flight deck. Each of these television cameras is arranged to yield information regarding some aspect of the landing of an aircraft—for example, the distance (if any) by which the landing aircraft departs from its proper glide path. Also obtainable is data concerning the point at which the aircraft actually "touches down" upon the landing surface, as well as the exact time of landing, the date, the wind velocity and the speed of the aircraft as determined by radar evaluation. This last-mentioned data may be recorded on a storage medium along with the image of the landing aircraft, so that a complete record of all of the factors involved is produced in a form capable of being subsequently evaluated.

In one design which has proven to be particularly efficient, three television cameras are employed, one of which is located along the center line of the carrier's flight deck. This camera is positioned to view an aircraft as it approaches for a landing. The lens system of the camera includes a pair of cross-hairs which enable an observer of the reproduced image to determine whether or not the aircraft is "in the groove" and on a glide slope such that it will set down properly upon the landing surface. A second camera is located on the "island" structure of the carrier, and normally follows an aircraft after it passes over the center-line camera until such time as it has been caught and stopped by an arresting cable. This camera is provided with a "zoom" lens which allows the cameraman to "plan" the entire deck area and obtain a close-up of any accident or crash which may occur. Also, the operator of this camera may "zoom" in for a close-up of the number of the aircraft (for identification purposes) and also record the condition of the arresting cable which has intercepted the aircraft. If the plane should bolt, the cameraman can follow it as it departs the ship, and the pilot can be later informed of any error in judgment which might have necessitated such action. The third camera of the system is constantly focused on a data or "tote" board, upon which are mounted dials or indicators showing the wind direction, wind speed, time, date, and aircraft speed as determined by radar evaluation. The image obtained by this last-mentioned camera is superimposed upon the image developed by either of the first two mentioned cameras, so that the exact environmental conditions prevailing at any particular instant of time can be readily ascertained. The respective outputs of the cameras are displayed on monitors in the control room of the carrier, and an operator, while viewing these monitors, may select any or all of the outputs thereof for respective distribution to a number of remote points at which further monitors are located. One such monitor, for example, is positioned so that it may be viewed directly by the Landing Signal Officer, who can observe thereon the position of an approaching aircraft and then signal the pilot thereof as to any positional corrections which in his opinion may be desirable. The information distributed to these monitors is also recorded in permanent form on some storage medium such as a magnetic tape, and this data may be played back at any subsequent time for observation by the particular aircraft pilot involved or by those evaluating the landing in the event of an accident. An important consideration inherent in the ability of this system to store information of the type discussed for subsequent playback is that a pilot is given a chance to "look himself over" after he completes a flight, and thus aid him in spotting possible safety hazards or a bad approach which, if repeated, might result in a future crash.

In addition to the monitoring devices mentioned above, a still further television picture is produced in the cockpit of the aircraft where it can be viewed by the pilot as he approaches for a landing. The image displayed at this location is the one picked up by the camera mounted on the center line of the runway at the optimum touchdown point, and the horizontal deflection connections to the cathode-ray tube in the display device are preferably reversed so that the pilot "sees" his plane approaching with correct left-to-right orientation. By centering his plane image so that it is aligned with the set of cross-hairs, he is given assurance that the plane is on the proper approach path for a perfect landing even though the actual touch down point on the carrier may be wholly or partially obscured.

SUMMARY

A television-assisted aircraft landing system which does not take initiative away from the pilot as does a completely automatic arrangement, but instead provides him with a continuous pictorial representation of his craft relative to the proper approach path so that he can "fly-in" the plane even under adverse weather conditions. Each landing is monitored and recorded for subsequent play-back so that the pilot is given a chance to evaluate his own performance.

One object of the present invention is to provide a television-assisted landing system for aircraft.

Another object of the invention is to develop an image of an approaching aircraft by a camera tube on the landing area and televise this image back to the aircraft where it is presented to the pilot on a monitor, any deviation of this image from a center position on the monitor screen indicating the necessity for corrective action in order to maintain the plant in a proper approach path.

An additional object of the invention is to provide an improved system for monitoring the landing of aircarft on an area of restricted size.

A further object of the invention is to provide a system designed to expedite and facilitate the training of aircraft pilots insofar as their landing operations are concerned.

A further object of the invention is to provide the Landing Signal Officer of an aircraft carrier with more precise information as to the position of an aircraft approaching the carrier for a landing thereon.

An additional object of the invention is to provide a closed circuit television system designed particularly for use on aircraft carriers and by means of which all landing and take-off operations may be photographically recorded for subsequent evaluation and/or analysis.

A still further object of the invention is to provide a closed-circuit television system especially designed for use on aircraft carriers, and which employs a plurality of cameras strategically located at different points on the carrier structure, together with means for selecting the output of any one of such cameras either for display on a monitor or for recording on a storage medium.

Other objects, advantages, and novel features of the invention will become apparent from the following detailed description of the invention when considered in conjunction with the accompanying drawings.

DESCRIPTION OF THE PREFERRED EMBODIMENT

Figure 1:
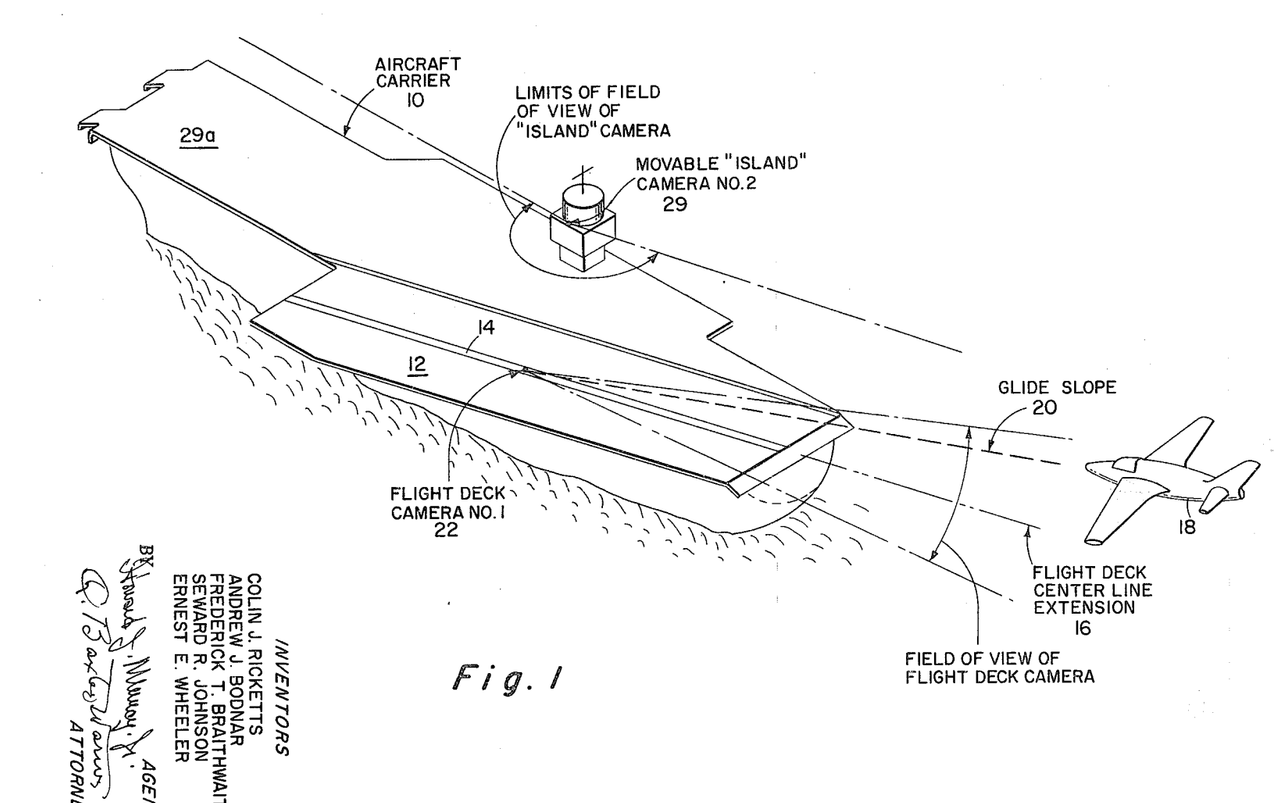
FIG. 1 is a perspective view of an aircraft approaching a carrier for a landing thereon, also showing carrier locations at which a plurality of television cameras may be placed.

Referring now to the drawings, there is shown in FIG. 1 an environment of the kind wherein the present concept finds particular utility. As shown, an aircraft carrier, generally identified by the reference numeral 10, is designed with a relatively short angled flight deck 12. The center line of the flight deck 12 is commonly provided with a visible marking 14, and, for descriptive purposes, such center line is assumed to extend aft of the vessel, as illustrated by the broken line 16.

An aircraft 18 is shown approaching the flight deck 12 of the carrier 10 for a landing. The normal pattern followed by the aircraft 18 is along a curved path in azimuth before turning into alignment with a vertical plane containing the center line marking 14 (and its projection 16). Accordingly, it will be assumed that the correct path for the aircraft 18 to follow in effecting a safe landing is that designated in the drawing by the reference numeral 20, this path 20 forming an angle of approximately 3½ to 4 degrees with respect to the flight deck centerline marker 14 and its projected extension 16.

Figure 2:
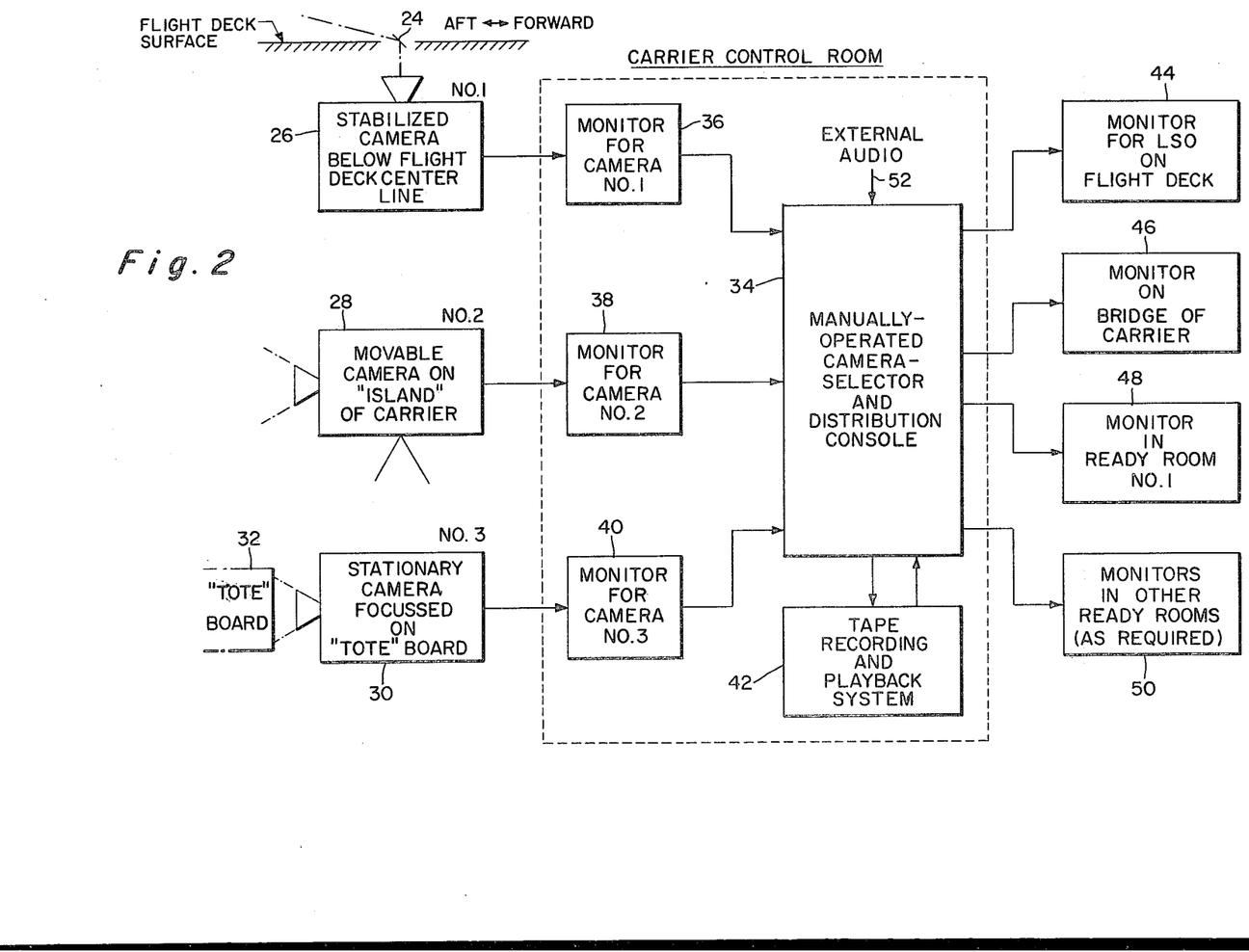
FIG. 2 is a block diagram of one form of television system especially designed to incorporate the cameras illustrated in FIG. 1.

In accordance with a preferred embodiment of the present invention, a television camera is located along the flight deck centerline 14 and intermediate the respective flight deck overhangs. This television camera, the location of which is identified in FIG. 1 by the reference numeral 22, is arranged to view the aircraft 18 as it approaches the flight deck 12 for a landing thereon. In order to obtain an accurate image of the aircraft 18 as it follows the designated flight path 20, the camera is arranged to be essentially co-extensive with the surface area of the flight deck, and, since it is obviously impracticable to impose the camera structure in the path of the landing aircraft, the camera itself (which is preferably an image orthicon) is located below the surface of the flight deck with its optical axis in an essentially vertical position. This is schematically illustrated in FIG. 2 of the drawings, with a reflective member 24 being utilized to direct an image of the approaching aircraft 18 to the photo-sensitive mosaic of the camera 26. The mirror or reflective member 24 may be enclosed and protected by a hemispherical steel disc (not shown) designed to prevent the tail hooks of landing aircraft from damaging the mirror assembly 24 during a landing operation. In practice, the mirror or reflective member 24 forms a portion of a stabilized unit which also includes the image orthicon camera together with its yoke assembly. These components are removed from the remainder of the camera electronics, the latter being mounted in some fixed position while the mirror 24, together with its associated components, is stabilized against movements of the vessel 10. This stabilized unit is designed to be immune to shock and vibration, and hence is capable of picking up an image of the approaching aircraft 18 which image is free from any lateral shifting due to pitching or rolling of the vessel 10, especially in rough seas. One suitable mounting arrangement for the television camera 26 of FIG. 2 and its associated optics is set forth in U.S. Patent 3,279,406 dated Oct. 18, 1966. Although the showing of this patent covers the transmission of light from a source located below the center line of the carrier landing strip, nevertheless the television camera described in the present application works in essentially reverse order to pick up light from an approaching aircraft rather than to transmit certain visible indications thereto. Inasmuch as a complete description of the design and operation of such a centerline optical assembly is set forth in the mentioned patent, no further details of the "periscope" arrangement of FIG. 2 of the drawings are believed to be necessary. It might be mentioned, however, that any stabilized optical arrangement which can be mounted below the surface of the flight deck of the aircraft carrier in question will be suitable for employment in the system of the present disclosure as long as an image of the approaching aircraft can be reflected to a camera or pick-up tube located at such a point.

Although many different types of television pick-up tubes may be used in the centerline camera arrangement set forth in FIGS. 1 and 2 of the drawings, nevertheless it has been found in practice that a ruggedized high-sensitivity image orthicon tube commercially designated as #7198 provides high immunity from shock and vibration and also allows the viewing of aircraft landings under the extremely low light level conditions prevailing at night or during periods of poor visibility. This particular tube is capable of producing usable pictures with a photocathode illumination of $3 \times 10^{-5}$ foot candles. Taking into account losses due to lens speed, lens transmission, and average reflectance of the aircraft, tube #7198 will operate satisfactorily with an incident light level as low as $4 \times 10^{-4}$ foot candles. This is approximately equivalent to the incident light level produced by a scene illuminated only by starlight. Furthermore, tube #7198, by virtue of its extremely rugged construction, is capable of withstanding vibration up to 10 G's and shock up to 30 G's. It is contemplated that the camera incorporate a sun shutter to protect the tube from damage by direct rays of the sun, and also a remotely-controlled lens iris to adjust for changes in incident light level. However, all such expedients are well known in the art, and no detailed description thereof is thought necessary in the present specification. The face plate of the camera tube is etched or otherwise provided with crosshairs in order that an observer may more accurately determine the position of an approaching aircraft with respect to the glide path 20 of FIG. 1.

A second television camera 28 (FIG. 2) is positioned on the "island" of the aircraft carrier 10 at a location designated in FIG. 1 of the drawings by the reference numeral 29. The function of this camera 28 is to follow the aircraft 18 as it lands upon the flight deck 12, and also to observe such aircraft after it passes the location of the camera 26 located in the flight deck centerline. In other words, this camera 28 (designated as camera #2) follows the aircraft after it passes over the centerline (#1) and then normally "zooms" in for a close-up of the aircraft identification marking. Camera #2 is preferably manually operable, and is capable of "panning" the entire deck area. It is therefore highly useful in obtaining close-ups of any accidents or crashes which may occur, and, furthermore, if the landing aircraft should "bolt," the cameraman handling camera #2 follows the aircraft as it departs the carrier. A further function of camera #2 is to observe the particular arresting wire which the landing aircaft contacts and follow such wire back to its original position. Incidentally, camera #2, due to its wide field of view and ability to cover the entire deck of the carrier, is also employed to record launching operations from the area generally indicated in FIG. 1 by the reference numeral 29a. It has been found in practice that a particularly suitable tube for employment in camera #2 is an RCA TK11 image orthicon with a view finder. As above stated, this camera is provided with a zoom lens to enable the field of view to be changed from a wide-angle shot to a close-up. Although preferably manually operated, it is contemplated that this camera may be provided with automatic means for following a landing aircraft, such as by tracking the heat energy emitted from the aircraft exhaust.

The third camera employed in the system being described herein is a stationary camera designated in FIG. 2 of the drawings by the reference numeral 30. This camera 30 is continuously focused upon a panel containing a plurality of indicators, this device being commonly known in the information art as a "tote" board. The latter, identified by the reference numeral 32, may contain a series of dials or indicators respectively representing such environmetal factors as the date on which the particular landing operation occurs, the exact time of occurrence, and a radar evaluation of the speed of the landing aircraft. Other factors, such as wind speed and wind velocity, may also be displayed upon the tote board 32 and photographed by the camera 30. Additional information deemed to be necessary or desirable insofar as it pertains to the landing of a particular aircraft may also obviously be displayed upon the tote board 32 and included in the image picked up by the camera 30. This camera may incorporate any suitable type of pickup tube, but an RCA TK21C vidicon has been found to be particularly useful for the purpose.

It is contemplated that the electronic equipment employed to operate the cameras 26, 28 and 30 be of standard design and include, in the usual fashion, a synchronizing generator for routine service and a second similar sync generator available as a stand-by unit so as to provide uninterrupted service in case the first-mentioned generator should for any reason become inoperative. All three of the cameras 26, 28 and 30 are provided with driving, blanking and synchronizing pulses from a common source, so that their operation is coordinated in all respects. Merely as an example, the sync generator may be of a type known as the TG21, and is provided with means for locking to either a 60-cycle or a crystal reference frequency. The latter is usually preferable, and may even be essential because of possible frequency variations in the standard power supply of vessel 10. None of this electronic equipment is illustrated in the drawings for the sake of simplicity.

Camera 26, which is mounted along the center line of the flight deck and below the surface thereof, is designed to include an automatic gain control amplifier that provides a constant video output for input level changes of up to approximately 12 db. It is desirable that this compensation be available in order to deliver a substantially constant video level input to a tape recorder independent of changes in the light level. It has been found that a constant vidoe level is definitely preferably in order to obtain a good qualtiy of tape recording. However, the function of the tape recorder will be discussed hereinafter in connection with other apparatus located in the control room of the carrier 10.

In the operation of the system being described, some means must be provided for selecting either the output of camera 26 or the output of camera 28 for presentation on a monitor and/or for recording on some information-storage device such as a magnetic tape. This selection is performed by an operator stationed in the control room of the carrier and seated before a camera selector and distribution console designated in FIGURE 2 of the drawings by the reference numeral 34. Arranged before the operator, and above the console 34, are three monitors 36, 38 and 40 on which are respectively presented the images picked up by the three television cameras 26, 28 and 30. The operator thus has a visual presentation before him of the three images which are available for selection and distribution to one or more remote points. Also located in the control room of the carrier, and preferably in proximity to the distribution console 34, is a tape recording and playback system 42 which is connected to, and controllable from, the console 34. Of course, other monitoring and checking equipment, such as one or more waveform monitors, are standard in systems of this nature, and may also be employed if desired. To simplify the drawing, however, only those portions of the system of FIG. 2 which are essential to operation of the system are illustrated. It should now be apparent that the operator seated before the console 34 may, by manipulation of switches or buttons, select the output of camera 26 or the output of camera 28 for distribution either to one or more monitors located at remote points and/or to the tape recording and playback system 42. With respect to the monitors mentioned, one monitor 44 is located upon the carrier flight deck at the point where the Landing Signal Officer normally stands while guiding aircraft for a landing. This monitor 44 normally displays thereon the output of camera 26, which in effect is a head-on view of the appoaching aircraft. A further monitor 46 is located on the bridge of the carrier, while an additional monitor 48 is set up in the carrier ready room, where the aircraft pilots are de-briefed after they have performed a landing operation. Of course, other monitors may be placed in as many strategic locations on the carrier as may be desirable. By proper selection of the console 34, the operator thereof may feed the output of the console to any one or all of the units 42, 44, 46 and 48 in accordance with the conditions existing at any particular time.

The tape recording and playback system 42 may be of any suitable design, such, mor example, as one including a 2-inch magnetic tape which can record continuously for up to approximately 90 minutes. A tape may be utilized which requires no processing, and hence it can be played back immediately for study and evalution. On the other hand, the tape may be stored indefinitely for record purposes in the event of an accident or crash. Also, the tape data can be transferred to motion picture film for use where tape playback equipment is not available. As an additional feature, an audio channel including the conductor 50 leads to the console 34 and permits simultaneous recording of audio signals as, for example, the instructions of the LSO on the tape of unit 42 along with the televised image. According to the manner in which console 34 is operated, this audio information received over the conductor 50 may be recorded by the system 42 along with the recording of a televised image, or it can be added to the playback data from system 42 when the recorded information is re-run during a debriefing session. It will be apparent that because of this flexible switching arrangement any location, such as a ready room, can view an actual landing, and then immediately switch to a tape playback of that same landing. As a still further feature, the output of the centerline camera 36 can be viewed on one or more of the monitors 44–48 while the output of the movable camera 28 is being recorded on tape by the playback system 42. In other words, the system disclosed is completely versatile, and can be arranged to fit any particular set of requirements.

Figure 3A:
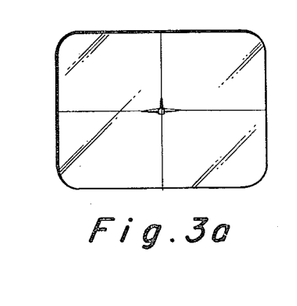
FIGS. 3a–3c illustrate an aircraft as it might be viewed at successive instants of time by one of the television cameras of FIGS. 1 and 2.
Figure 3B:
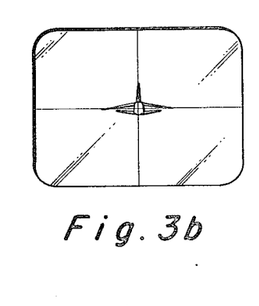
Figure 3C:
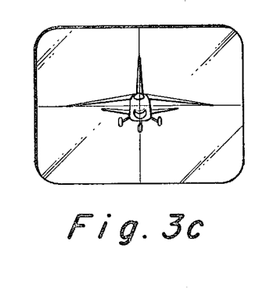
Figure 4:
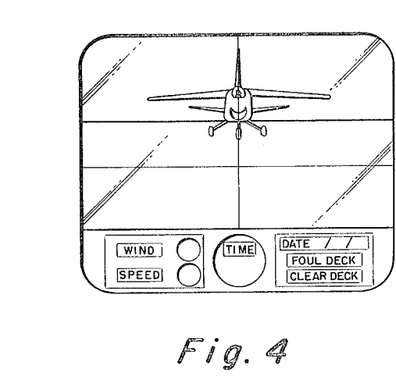
FIG. 4 illustrates a representative image such as might be developed on one or more of the carrier monitors included in the system of FIG. 2.

FIGS. 3a–3c illustrate an image of an approaching aircraft as it might be picked up by the camera 26 at three successive instants of time. In 3a the aircraft is at a distance, while in 3b and 3c it is approaching the carrier in a correct position along the glide slope 20. FIG. 4 illustrates a representative presentation on one of the monitors 44–48 when an image developed by the camera 26 has combined therewith the information appearing on the tote board 32. Any segment of the monitor picture may have this environmental data added thereto, and in FIG. 4 such addition occurs in the lower portion of the overall image.

The operator of the console 32 will of course select for distribution the image from either monitor 36 or monitor 38 which provides the most informative view of the landing aircraft at the particular instant of time the selection is made.

The preceding description has been directed to the monitoring feature of applicants' overall concept. As previously brought out, however, the present invention also embraces means for assisting the aircraft pilot to land his plane by providing him with a cockpit television receiver on the sceen of which appears an image of his own plane as seen by the camera located on the carrier flight deck centerline. By so guiding the aircraft that the image reproduced on the screen of this receiver is brought to a center position and maintained in such position, the pilot can follow the proper approach path to a perfect landing even though the carrier itself may be wholly or partially obscured by poor weather conditions.

Figure 5:
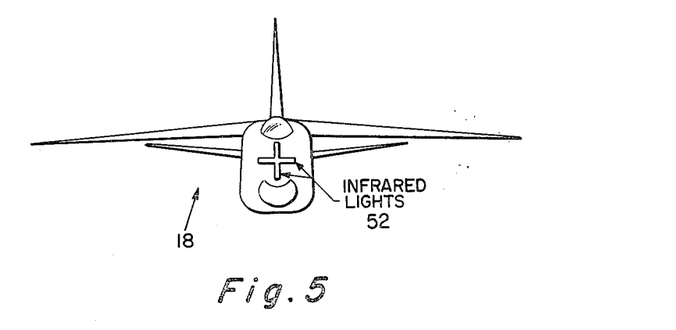
FIG. 5 illustrates the manner in which a pair of crossed infra-red lights may be installed in the nose of an aircraft approaching a carrier on which the system of FIG. 2 has been installed.

In order to carry out the above objective, the aircraft must be "picked up" by the camera even at a considerable distance from the carrier. This can be facilitated if the aircraft is provided with a source of illumination which is readily discernible by the camera even under adverse weather conditions. Such a source might, for example, comprise an array or pattern of infra-red lights placed on the nose of the aircraft in some manner such as brought out by FIG. 5 of the drawings, where the lights 52 are disposed to form a cross. A lenticular lens (not illustrated) may, if desired, be placed in front of each light to cause the emitted rays to spread or diverge and hence enlarge the apparent dimensions of the source as seen by the camera 26. The latter, under the conditions being described, may be of a type specially fabricated to be sensitive to infra-red light, many such designs now being available commercially. Obviously, ordinary lights with infra-red filters may be substituted for the sources described above if necessary or desirable.

Figure 6:
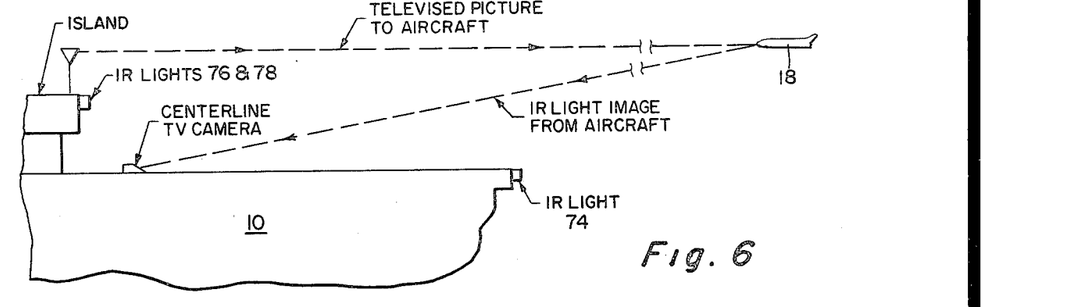
FIG. 6 illustrates how an image of the infra-red lights on the aircraft shown in FIG. 5 is picked up by the corners on the carrier and televised back to the aircraft.

When the aircraft 18 is within the field of view of the camera 26 as shown in FIG. 6, an image of the light 52 will appear on the screen of the monitors 44–48 (if so switched thereto through the console 34 of FIG. 2) and also will be applied to a transmitter 54 from which a signal represenative of this picture is radiated to the aircraft 18 in a manner schematically brought out in FIG. 6.

Figure 11:
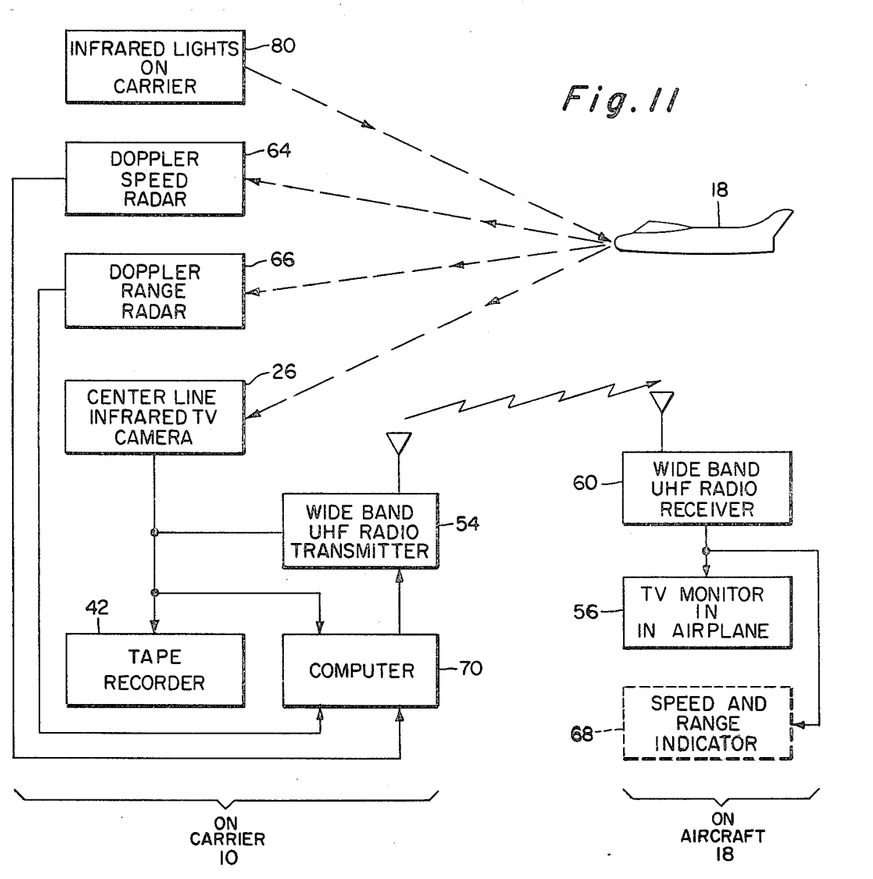
FIG. 11 shows additional apparatus for use with the system of FIG. 2 in order to supply speed and range information to the pilot of the aircraft of FIG. 6.

In the cockpit of aircraft 18 is a television monitor 56 (FIG. 11) having a screen 58 (FIGS. 7 through 10) on which the image picked up by camera 26 is reconstituted after reception by the aircraft receiver 60. Such image is identified in the drawing by the reference numeral 62. It will be understood that the horizontal deflection terminals of monitor 56 are reversed to present the image 62 to the pilot with correct left-to-right orientation.

The television transmitter 54 need radiate only a low-power signal adequate to reach aircraft 18. Both transmitter 54 and receiver 60 are preferably of the UHF type operating over a relatively wide band of frequencies.

Figure 7:
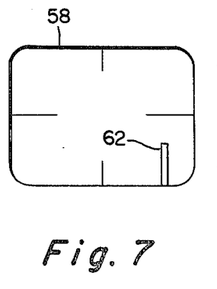
FIGS. 7 through 10 show images such as might appear on the monitor in the aircraft cockpit for different positions of the aircraft relative to the correct approach path to the carrier.
Figure 8:
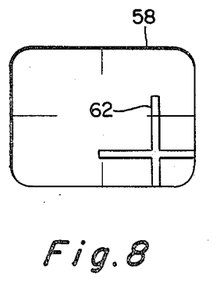
Figure 9:
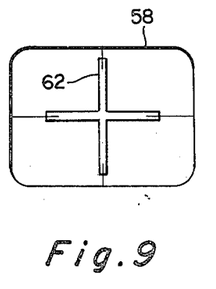
Figure 10:
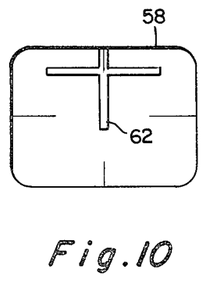

If the aircraft 18 is approaching the flight deck 12 low and to the right, the pilot will see the image 62 on screen 58 as illustrated in FIG. 7. Applying the necessary corrections to his aircraft, the pilot will observe the image moving to a position as shown in FIG. 8 and then to the correct or centered position of FIG. 9, which position should be maintained to effect a proper landing on the flight deck. If the image 62 is initially in the location of FIG. 10, only a downward correction is required, and so on. The pilot need not even see the carrier until his craft is in the immediate proximity thereof.

Obviously other information may be sent by the transmitter 54 in addition to the television picture 62. Doppler speed and range information may be derived by conventional devices 64 and 66, respectively, and presented to the pilot on an indicator 68. It is also possible to employ a computer 70 which can correlate the information derived from the apparatus 26, 64 and 66 if an automatic control signal is to be transmitted to aircraft 18 which is capable of bringing about a landing without any action on the part of the pilot.

It is contemplated that the system above described will be utilized at times when the aircraft 18 is at a considerable distance from the carrier 10 and the camera 26 cannot "see" the plane but can pick up the infra-red lights 52 carried thereon. As the plane nears the landing strip, however, it is desirable that the pilot see the plane itself on the screen of monitor 56 rather than the image 62.

Figure 12:
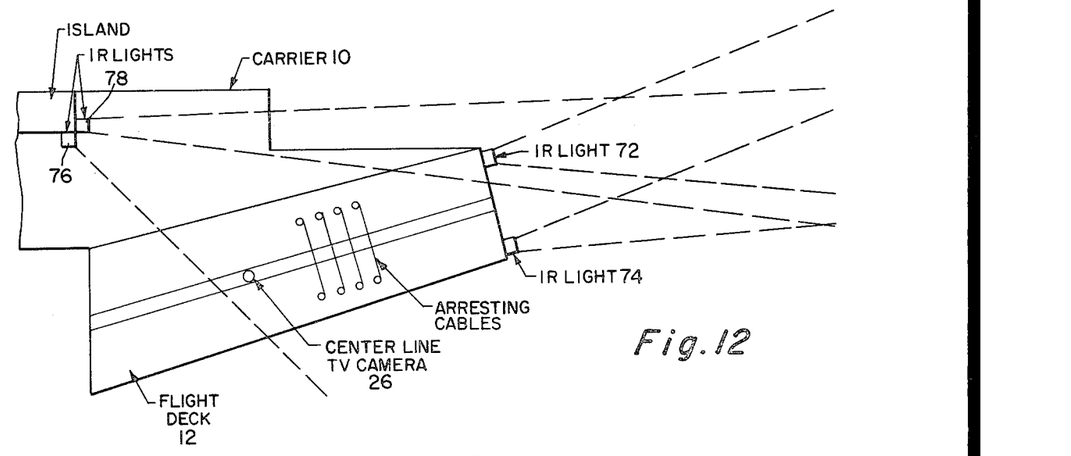
FIG. 12 illustrates the use of a plurality of infra-red flood lights installed on the carrier in order to more clearly illuminate an approaching aircraft especially under conditions of poor visibility.

To facilitate this operation, a plurality of infra-red floodlights are installed on the carrier 10 as shown in FIGS. 6 and 12 of the drawing. Two such lights 72 and 74 are positioned aft and on opposite sides of the flight deck 12 as shown in FIG. 12, while two additional lights 76 and 78 may be located in an elevated spot on the carrier island. All of these lights as a group are schematically designed in FIG. 11 by the reference numeral 80.

As the aircraft 18 reaches a region where it is illuminated by the infra-red floodlights 80 on the carrier, the pilot switches off his own infra-red lights 52 and consequently sees his own plane on the monitor screen 58. The picture now viewed is shown in FIGS. 3a, 3b and 3c as the touch down point becomes nearer, assuming the plane is following the correct approach path. At some point he will see the conventional Fresnel lens or mirror (not shown) which assists him in the final landing stage.

Since the penetration of infra-red energy is approximately two to four times better than standard illumination in rain or heavy fog, the use of floodlights of this type on the carrier enables the optical range of the described landing aid to be greatly extended. Furthermore, by presenting the pilot with a visual image of his aircraft relative to an ideal reference position, he can effect an early "line-up" with complete confidence even under the most adverse weather conditions.

Obviously many modifications and variations of the present invention are possible in the light of the above teachings. It is therefore to be understood that within the scope of the appended claims the invention may be practiced otherwise than as specifically described.

What is claimed is:

1. A system for visually indicating to the pilot of an aircraft approaching a runway for a landing thereon the position of his craft with respect to an optimum glide path the following of which will bring about a proper landing of the craft on the runway, such system being effective even though the said runway is wholly or partially obscured from pilot's view by adverse environmental conditions, said system comprising:

a television camera located along the center line of said runway and having an optical axis essentially coinciding with the said optimum glide path, said camera thus obtaining a nose-on view of said aircraft as it approaches said runway for a landing thereon;

means for televising to said aircraft a signal representative of the image pickup by said camera;

means on said aircraft for receiving the signal so televised;

a television monitor in said aircraft and visible to the pilot thereof; and means for applying the received television signal to said monitor so as to reconstitute on the screen thereof the image picked up by said camera.

2. A system according to claim 1 in which said television camera is designed to be sensitive to the reception of infra-red energy.

3. A system according to claim 2, further including a source of infra-red emission located on the nose of said aircraft so as to extend the range over which an image representative of said aircraft may be picked up by said camera.

4. The system of claim 3 in which said source of infra-red emission is in the form of a cross.

5. A system according to claim 4, further including at least one infra-red floodlight located adjacent said runway and directed toward said aircraft so as to illuminate the latter as it approaches said runway for a landing thereon and thereby make said craft more visible to said television camera.

6. A system for visually indicating to the pilot of an aircraft approaching a runway for a landing thereon the position of his craft with respect to an optimum glide path the following of which will bring about a proper landing of the craft on the runway, such system being effective even though the said runway is wholly or partially obscured from the pilot's view by adverse environmental conditions, said system comprising:

an image pickup device located along the center line of said runway and having an operating axis essentially coinciding with the said optimum glide path, said device thus obtaining a nose-on aspect of said aircraft as it approaches said runway for a landing thereon;

means for transmitting to said aircraft a signal having a portion representative of the image picked up by said device and a further portion representative of the said optimum glide path;

means on said aircraft for receiving the signal so transmitted; and means for presenting to the pilot of said aircraft the received signal so as to enable him to establish and/or maintain a given relationship between that portion of said signal which is representative of said image and that portion of said signal which is representative of said optimum glide path, the establishment and/or maintenance of such given relationship resulting in a proper approach of said aircraft to said runway.

References Cited

UNITED STATES PATENTS

| | | |
|---|---|---|
| 1,699,270 | 1/1929 | Baird. |
| 2,121,771 | 6/1938 | Jones.. |
| 3,195,125 | 7/1965 | Reitler. |
| 3,278,680 | 10/1966 | Hummel ____________ 178—6.8 |

ROMERT L. GRIFFIN, Primary Examiner

HOWARD W. BRITTON, Assistant Examiner

U.S. Cl. XR.

178—6.8